United States Patent

[11] 3,602,750

| [72] | Inventor | George Wesley Boyer<br>Covina, Calif. |
|---|---|---|
| [21] | Appl. No. | 846,744 |
| [22] | Filed | Aug. 1, 1969 |
| [45] | Patented | Aug. 31, 1971 |
| [73] | Assignee | Leach Corporation<br>South Pasadena, Calif. |

[54] MONITORING WHEEL OF GEAR-LIKE CONSTRUCTION
6 Claims, 3 Drawing Figs.

| [52] | U.S. Cl. | 310/168, 310/44 |
|---|---|---|
| [51] | Int. Cl. | H02k 19/24 |
| [50] | Field of Search | 74/12; 73/229; 310/168, 49, 169, 170, 97, 44, 45, 268; 75/22 |

[56] References Cited
UNITED STATES PATENTS

| 2,110,967 | 3/1938 | Andrews | 75/22 |
|---|---|---|---|
| 2,125,970 | 8/1938 | Waters | 310/44 |
| 3,132,337 | 5/1964 | Martin | 310/170 |
| 3,134,918 | 5/1964 | Eichenberger | 310/168 |
| 3,255,512 | 6/1966 | Lochner | 310/44 |
| 3,230,407 | 1/1966 | Marsh | 310/168 |

Primary Examiner—Milton O. Hirshfield
Assistant Examiner—R. Skudy
Attorney—Jackson & Jones ABSTRACT: A monitoring wheel is disclosed for monitoring the movement of a rotary device. The monitoring wheel utilizes a commercially available nonmagnetic precision gear having a mixture of metallic material and a bonding agent compacted within the space between the gear teeth. The mixture within the gear is then machined to approximately the pitch line to enable a plurality of evenly spaced pulse indicators to be formed about the periphery of the gear.

PATENTED AUG 31 1971                                3,602,750

INVENTOR.
GEORGE WESLEY BOYER
BY
Jackson & Jones
ATTORNEYS.

MONITORING WHEEL OF GEAR-LIKE CONSTRUCTION

BACKGROUND OF THE INVENTION

1. Field of the Invention

The present invention relates to means for monitoring the movement of a rotary device.

2. Description of the Prior Art

Rotary monitoring means have many applications in observing and recording the movement of a rotary device. One application involves speed control, wherein a tachometer wheel, rotating at the same speed as the monitored rotary device, gives off a phase signal which is compared with the phase signal of a recorded synchronizing signal. If the phase signals do not coincide, adjustments are made to the speed of the rotary device until the signals do coincide.

Another application utilized the monitoring means as a position indicator wherein an encoder wheel, connected to the rotary device, gives off phase or pulse signals which are read by a digital readout system to indicate the angular position of the encoder wheel and the rotary device.

Although monitoring wheels are used extensively in many applications, their utilization is severely limited by the fact that they are extremely expensive to produce. As a general rule, these wheels must be made with high precision and since they are not readily available, they must be specially made, thereby rendering the cost of such devices exorbitantly high.

SUMMARY OF THE INVENTION

The present invention obviates the above shortcomings by providing a monitoring wheel utilizing a commercially available nonmagnetic precision gear and filling the pockets between the gear teeth with a mixture of metallic material and a bonding agent. The mixture within the gear is machined to approximately the pitch line thereof to enable a plurality of evenly spaced pulse indicators to be formed about the periphery of the gear, thereby fulfilling a primary object of the invention, i.e. providing a monitoring wheel having high precision characteristics that can be relatively inexpensively fabricated.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
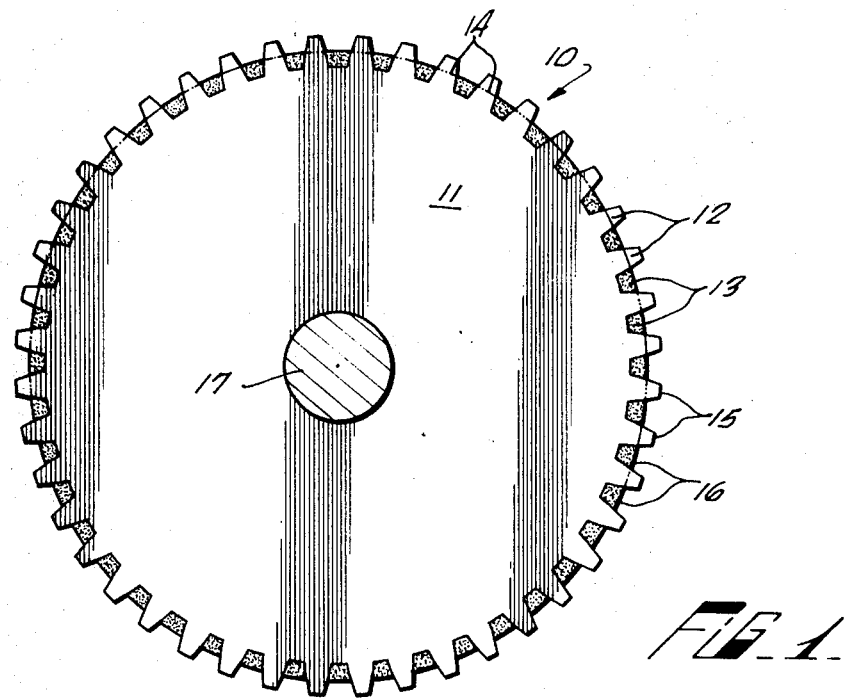
FIG. 1 is an elevational view of a monitoring wheel of the present invention.

The gear manufacturing art has progressed to a high level of competence where fine precision gears can now be manufactured quite inexpensively and are commercially available in many forms. The present invention utilizes commercially available gears that are nonmagnetic, such as aluminum, nylon, plastic, etc., and a typical example is shown in FIG. 1 wherein a gear, generally indicated by arrow 10, includes an annular body portion 11 having a plurality of radially extending teeth 12 peripherally spaced about the circumference thereof. The shape of the teeth can be of any conventional configuration since they are not to be engaged with any other set of teeth. However, it is still important that the gear be machined to precision standards now common in the gear fabricating art.

Compacted within the pockets formed between each of the gear teeth 12 is a mixture 13 which is comprised of a metallic material and a bonding agent. A preferred mixture is a composition of iron powder and epoxy. The mixture 13 can be applied to the teeth pockets in any conventional manner with the preferred quantity of mixture being sufficient to completely envelope the periphery of the gear 10. Thereafter, the mixture is machined by any conventional means until it is machined down to the pitch line 14.

In the embodiment shown in FIG. 1, a cylindrical monitoring wheel is thus formed having an outer periphery of intermittently spaced gear tooth surfaces 15 and mixture surfaces 16, otherwise known as pulse indicators. The monitoring wheel 10 is now adapted to be engaged to a rotary device such as a shaft 17 and with the outer periphery thereof adapted to contact an electromagnetic sensing or pickup device.

Upon rotary movement of the wheel 10, the electromagnetic pickup intermittently contacts the nonmagnetic surface 15 and then the pulse indicators 16. As a result, a pulse signal is given off by the pulse indicators 16 and are recorded by the electromagnetic pickup system. Since the gear 10 is precisionally fabricated, the spacing of the gear tooth surfaces 15 and the pulse indicators 16 is highly accurate and uniform. Moreover since by definition, the width of each tooth and the space between the teeth at the pitch line are equal, a uniform pulse is generated by the device.

It should also be noted that Ferrite or powdered Alnico can be used in lieu of powdered iron, thereby enabling standard record heads to be used in place of the electromagnetic pickups to further reduce the overall cost of the system.

Figure 2:
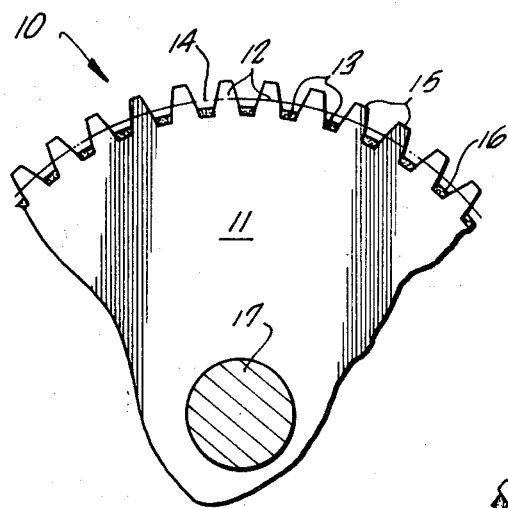
FIG. 2 is a fragmentary elevational view of a second embodiment of the present invention.
Figure 3:
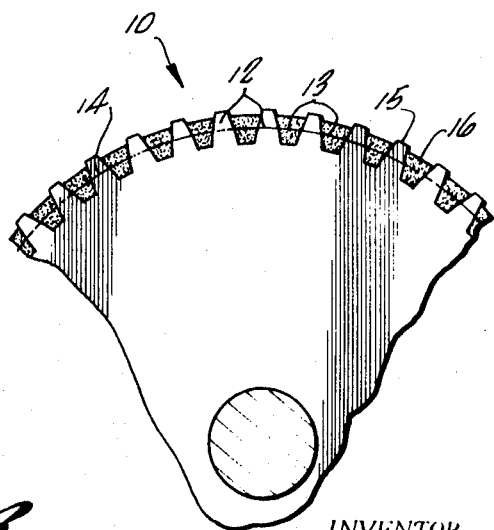
FIG. 3 is a fragmentary elevational view of a third embodiment of the present invention.

Although the embodiment in FIG. 1 shows the mixture 13 being machined to the pitch line, the mixture 13 can also be machined below the pitch line, as shown in FIG. 2, or above the pitch line, as shown in FIG. 3. The difference among these embodiments is the type of pulse signal given off. In FIG. 2 the length of the pulse will be less than in FIG. 1, because of the relatively wider teeth surface 15 exposed and a correspondingly narrower band pulse indicator 16 contacting the pickup means. Conversely, the signal given off by the embodiment shown in FIG. 3 will have a longer pulse because of the relatively wider bands of pulse indicators.

As can be seen, such a device can be quite economical to manufacture, since precision gears are now readily available and are relatively inexpensive. The cost of applying the mixture 13 to the pockets between the gear teeth 12 and machining it to approximately pitch line is also minimal.

It will be apparent from the foregoing description that there is disclosed a highly precise and economical monitoring wheel which can be made of several materials and of various shapes and sizes without departing from the scope of this invention.

What is claimed is:

1. A monitoring wheel for monitoring the movement of a rotary device comprising:

a gear of nonmagnetic material having a plurality of radially extending teeth peripherally spaced about the circumference thereof, each gear tooth being defined by a top wall portion and a pair of sidewalls which slope downwardly and outwardly from said top wall, said gear further defining a pocket between the sidewalls of each pair of adjoining gear teeth; and a quantity of magnetic composition compacted within the pockets formed between the gear teeth thereby forming a plurality of pulse indicators located intermittently about the periphery of the gear, the top of each of said pulse indicators includes an outer arcuate surface substantially approximating the curvature of the gear, the band width of each arcuate surface progressively diminishing as the depth of the pulse indicator decreases.

2. The invention of claim 1 wherein said arcuate surfaces are located on the pitch line with the outer surfaces of the gear teeth being intermittently spaced therebetween.

3. The invention of claim 1 wherein said arcuate surfaces are located above the pitch line to form relatively wider band pulse indicators extending about the periphery of the gear.

4. The invention of claim 1 wherein said arcuate surfaces are located below the pitch line to form relatively narrower band pulse indicators extending about the periphery of the gear.

5. The invention of claim 1 wherein said quantity of magnetic composition is formed from a mixture of metallic powder and a bonding agent.

6. The invention of claim 1 wherein said gear is made of nonferrous metal.